United States Patent
Itoh

(10) Patent No.: US 6,473,193 B1
(45) Date of Patent: Oct. 29, 2002

(54) IMAGE PROCESSING APPARATUS

(75) Inventor: Akira Itoh, Ogori (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/351,294

(22) Filed: Jul. 12, 1999

(30) Foreign Application Priority Data

Jul. 14, 1998 (JP) .......................................... 10-198498

(51) Int. Cl.[7] .............................................. G06K 15/00
(52) U.S. Cl. ..................................................... 358/1.16
(58) Field of Search ................................ 358/1.1, 1.13, 358/1.16, 1.17; 711/171, 203; 707/100; 345/530, 531, 532, 536, 537, 538, 543, 544, 545, 546, 562, 564, 565, 566, 568, 572–574

(56) References Cited

U.S. PATENT DOCUMENTS 5,539,899 A * 7/1996 Huynh et al. ................ 707/100

* cited by examiner

Primary Examiner—Arthur G. Evans
(74) Attorney, Agent, or Firm—Stevens, Davis, Miller & Mosher, LLP

(57) ABSTRACT

An image processing apparatus divides an address space in which input image data are arranged into a plurality of blocks and can change a block from which reading of the image data in each line is started and a data reading start address in each block, so that an output image to an input image can be processed or corrected freely or deviation of the output image to the input image can be corrected.

10 Claims, 8 Drawing Sheets

IMAGE PROCESSING APPARATUS

BACKGROUND OF THE INVENTION

1. Field of the Invention

The present invention relates to a peripheral apparatus of a computer and more particularly to a printing apparatus capable of attaining high-speed processing by means of a laser beam.

2. Description of Related Art

In recent years, products such as laser beam printers have increased opportunities of printing a large capacity of image data stored in a computer at a high speed with high image quality. In this case, it is a main current that a plurality of kinds of image data are combined with or superimposed on one another to perform full-color printing.

However, in a conventional apparatus, when the plurality of kinds of image data are superimposed on one another, any positional deviation occurs among the image data due to various causes. Accordingly, in order to attain exact image positioning, it is necessary to change an optical path such as an optical system and it is very expensive.

Accordingly, it is an object of the present invention to solve the above problem by providing an inexpensive image processing apparatus capable of processing a large capacity of image data at a high speed with high image quality.

SUMMARY OF THE INVENTION

The present invention is characterized in that an address space in which inputted image data are arranged is divided into a plurality of blocks and a block from which reading of image data in each line is started and a data reading start address in each block can be changed.

Thus, an output image to an input image can be processed or corrected freely, or deviation of the output image to the input image can be corrected.

DESCRIPTION OF THE PREFERRED EMBODIMENTS

Embodiments of the present invention are now described with reference to the accompanying drawings.

(Embodiments 1)

Figure 1:
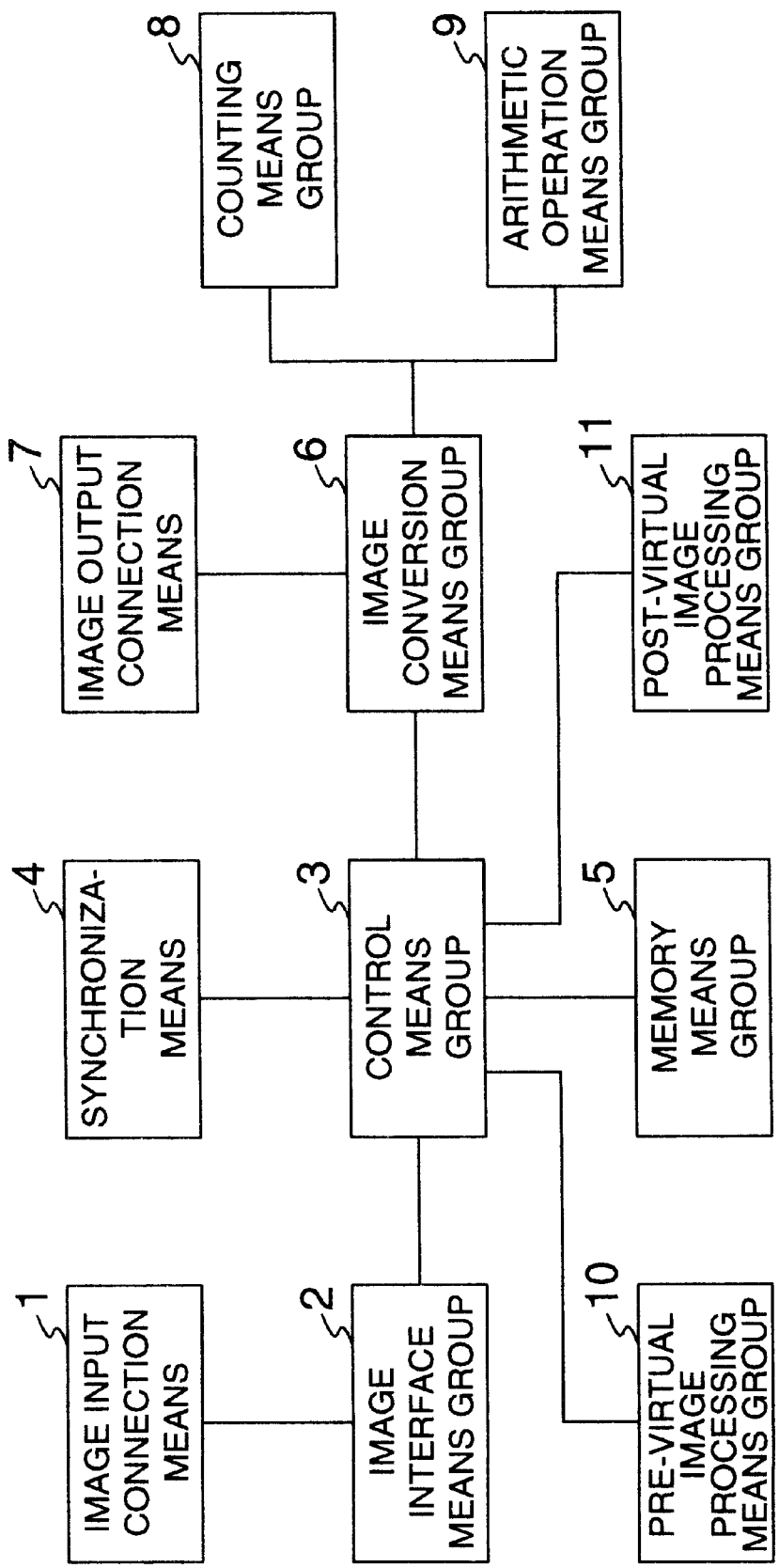
FIG. 1 is a block diagram schematically illustrating embodiments 1 to 3 of the present invention.

FIG. 1 is a block diagram schematically illustrating the embodiment 1 of the present invention.

Numeral 1 denotes image input connection means capable of being connected to an external apparatus, 2 an image interface means group for performing delivery and receipt of image data transferred from the external apparatus, 3 a control means group for controlling the whole system on the basis of control information designated by the external apparatus, 4 synchronization means for synchronizing operation of each control means, 5 a memory means group including a plurality of independent memory areas for storing a plurality of image data groups and controlled by the control means group, 6 an image conversion means group for performing conversion processing of an image with respect to an image data group stored in the memory means group, and 7 image output connection means for transmitting image data subjected to image processing to the external apparatus.

Figure 2:
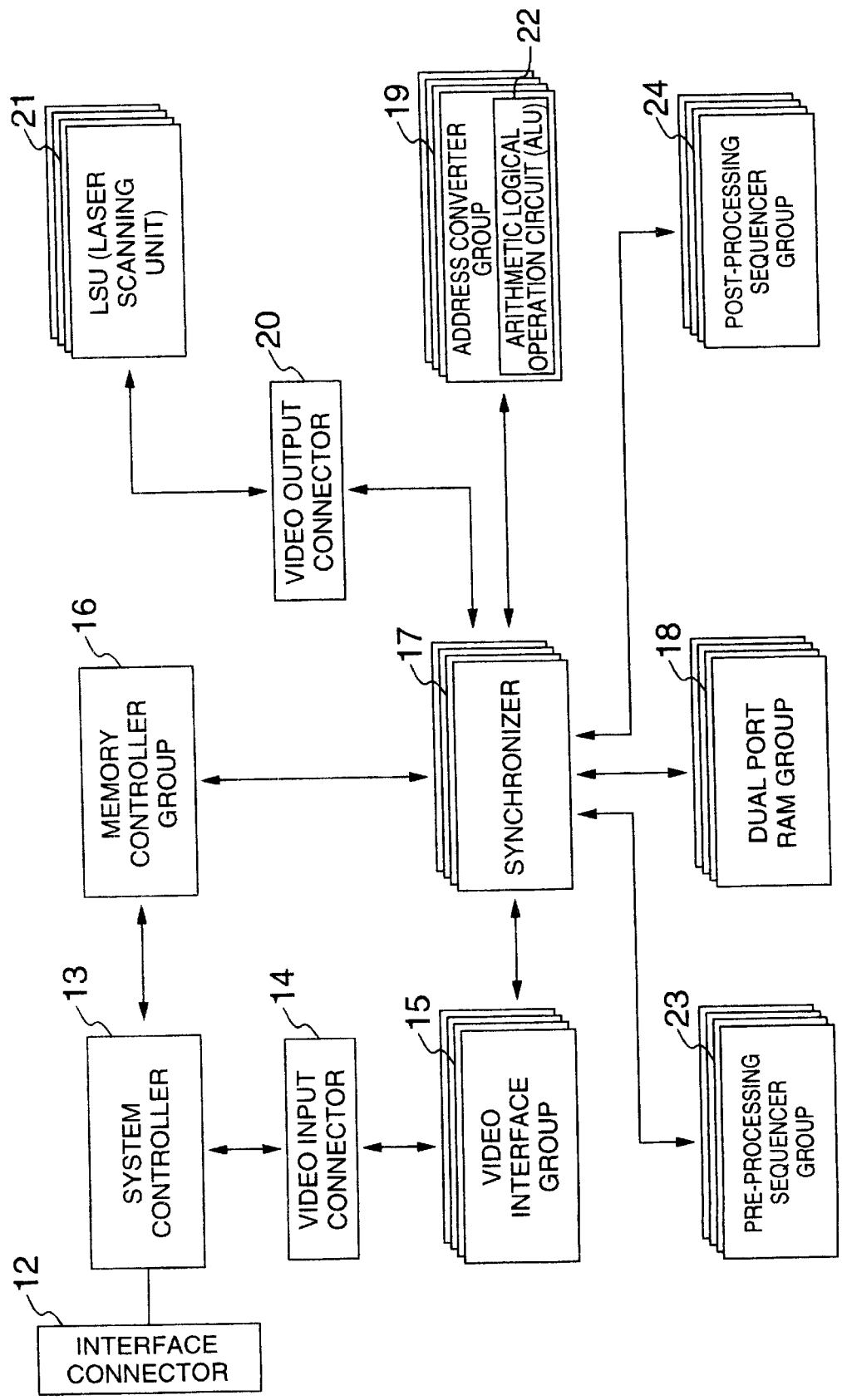
FIG. 2 is a circuit block diagram schematically illustrating the embodiments 1 to 3 of the present invention.

FIG. 2 is a circuit block diagram schematically illustrating an image processing apparatus in the embodiment 1 of the present invention.

In FIG. 2, an interface connector 12 is connected to the external apparatus and is used for communication and delivery and receipt of image data between the image processing apparatus and the external apparatus. A system controller 13 performs delivery and receipt of a print starting command and a status between the image processing apparatus and the external apparatus. A video input connector 14 realizing the image input connection means 1 is disposed or connected between the image processing apparatus and the system controller 13. Connected to the video input connector 14 are a control bus for designation a printing area and a data bus for delivery and receipt of image data between the external apparatus and the image processing apparatus. A video interface group 15 realizing the image interface means group 2 receives a plurality of kinds of image data such as cyan (C), magenta (M), yellow (Y) and black (K) transmitted from the image input connection means 1 (video input connector 14). A memory controller group 16 realizing the control means group 3 includes a control register group accessible from the system controller 13 and performs image processing control, memory access control, state transition control and the like on the basis of designated control information. A synchronizer 17 realizing the synchronization means 4 synchronizes start of processing of a plurality of kinds of images such as cyan (C), magenta (M), yellow (Y) and black (K) and prevents any temporal deviation from occurring among images. A dual port random access memory group (hereinafter abbreviated as a dual port RAM group) 18 realizing the memory means group 5 stores image data transferred from the external apparatus in real time. An address converter group 19 realizing the image conversion means group 6 can be controlled by the memory controller group 16 (control means group 3) and converts address information applied to the dual port RAM group 18 (memory means group 5). A video output connector 20 realizing the image output connection means 7 is connected to a laser scanning unit (hereinafter abbreviated as LSU). A plurality of image data processed by the memory controller group 16 (control means group 3) are converted into serial data to be transmitted to the LSU 21 through the video output connector 20 (image output connection means 7).

Function and operation of the embodiment structured above is now described.

Figure 3:
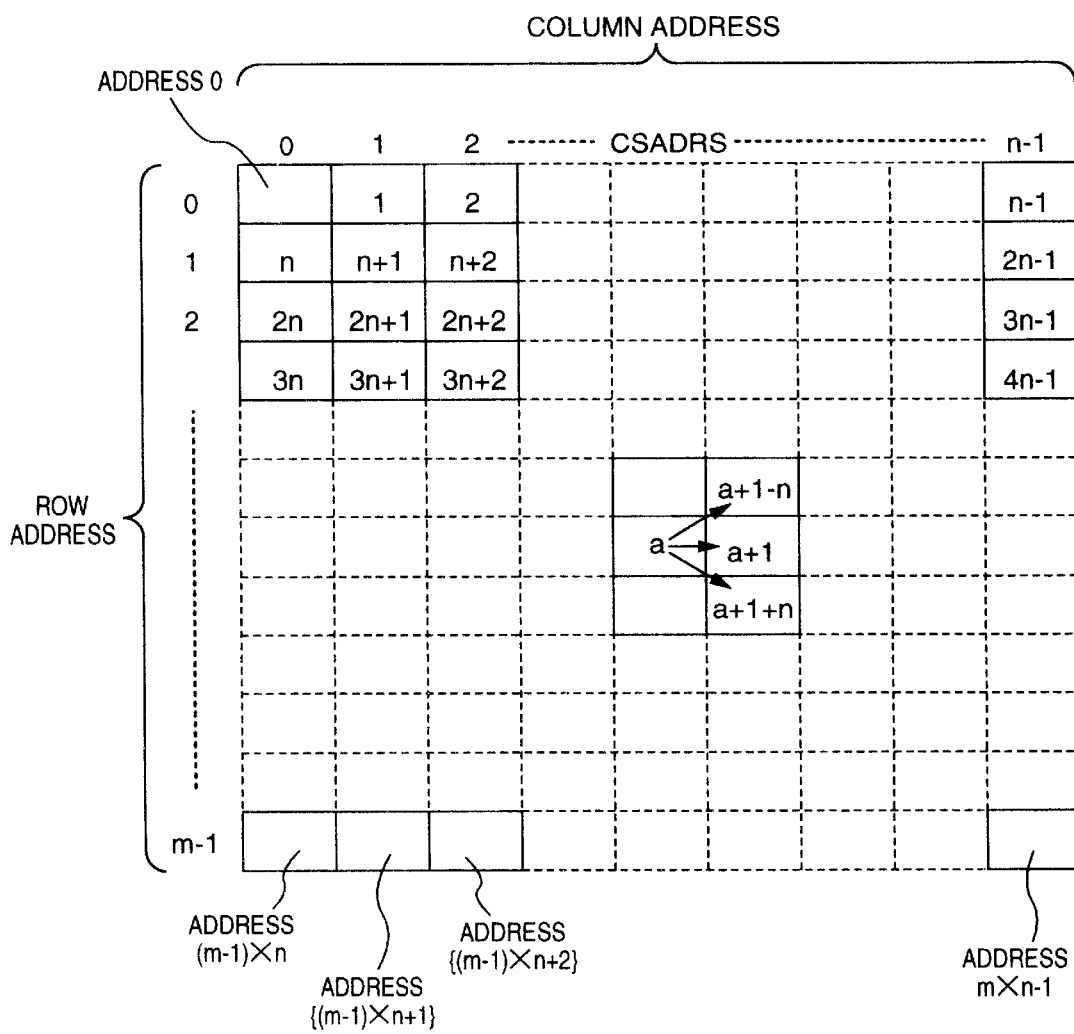
FIG. 3 is an address map diagram illustrating operation of the embodiment 1 of the present invention.
Figure 4:
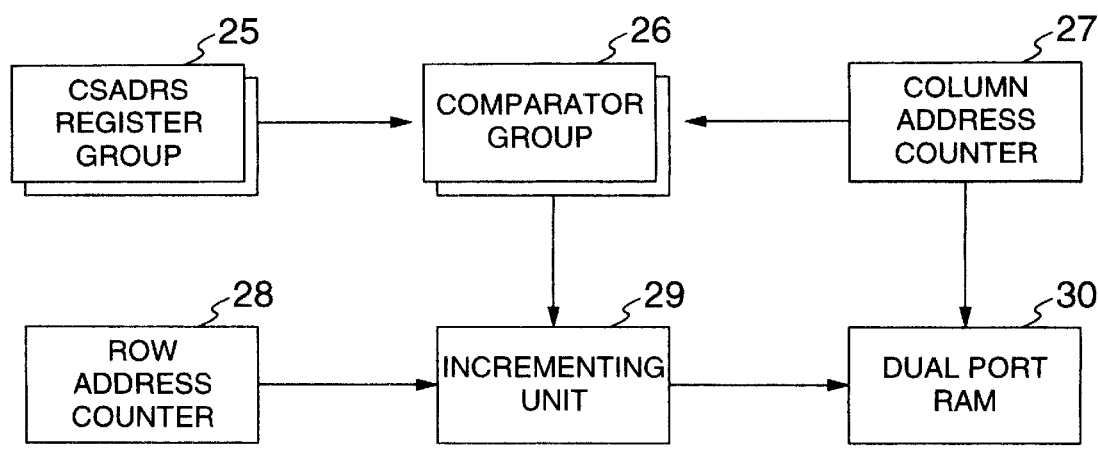
FIG. 4 is a diagram showing connection of an image conversion means group and a memory means group of the embodiment 1 of the present invention.

An address map in the memory means group 5 (dual port RAM group 18) in case where the control means group 3 (memory controller group 16) receives image data from the external apparatus is shown in FIG. 3. For simplicity of description, FIG. 3 shows the address map in one memory means 5 (dual port RAM 18). In the image processing apparatus, in order to perform delivery and receipt of a plurality of image data, memory areas having a plurality of different physical addresses are defined in the memory means group 5 (dual port RAM group 18) actually and the memory areas can be operated perfectly independent of one another. In FIG. 3, addresses 0 to {(m−1)×(n−1)} in a memory space shows an address area which can be directly accessed by the control means group 3 (memory controller group 16) and the system controller 13. In FIG. 3, n represents the number of image areas in the horizontal direction (main scanning direction) and m represents the number of image areas in the vertical direction (sub-scanning direction). The numbers of image areas can be changed freely in accordance with an image to be processed. A column address 0 to (n−1) can designate a position in the memory area in the horizontal direction (main scanning direction) and a row address 0 to (m−1) can designate a position in the memory area in the vertical direction (sub-scanning direction).

Figure 5:
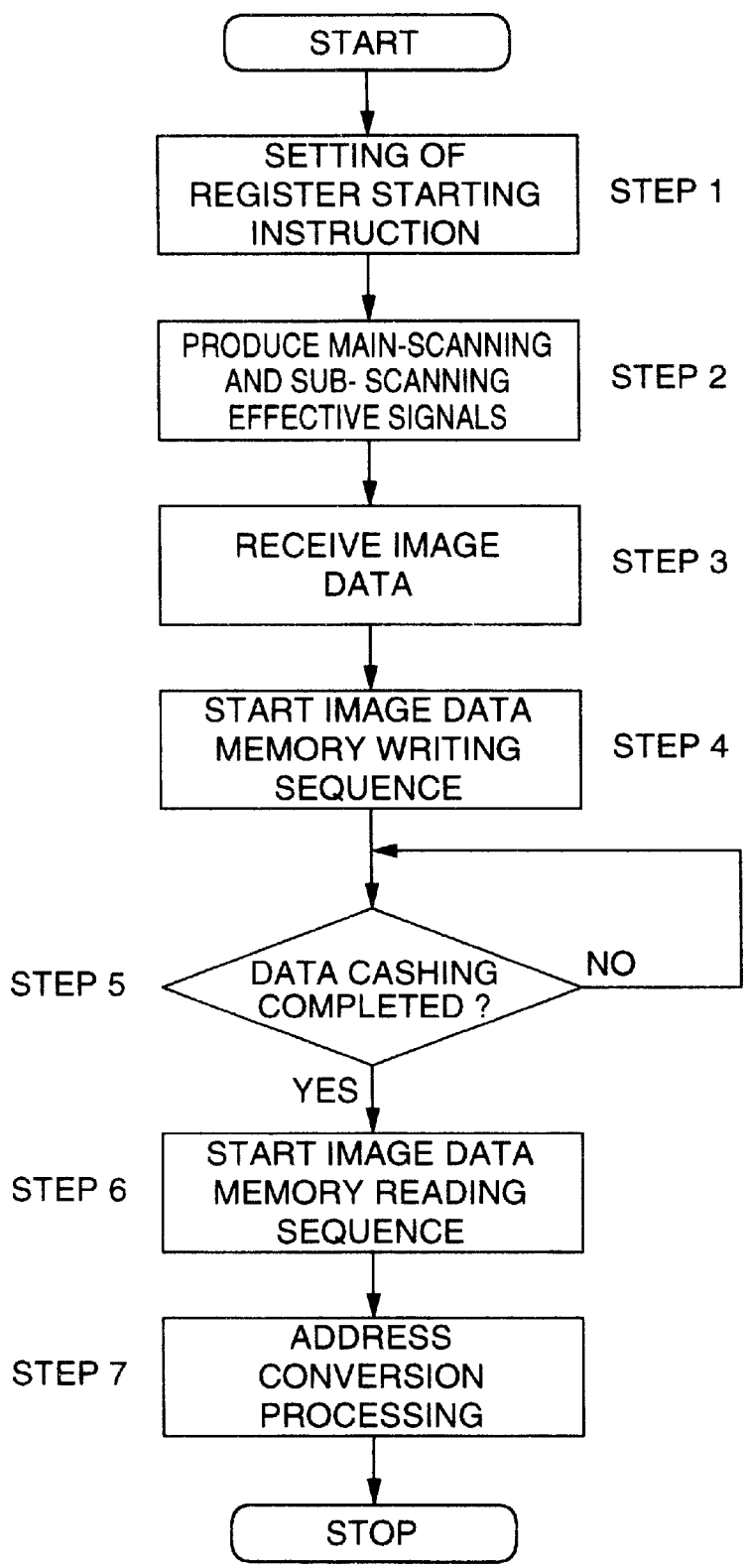
FIG. 5 is a flow chart showing operation of the embodiment 1 of the present invention.

Referring now to a flow chart shown in FIG. 5, a definite description of the image processing apparatus of the embodiment is made.

The system controller 13 sets values necessary for processing in a CSADRS register group 25 and issues a command for notifying the external apparatus that a printing operation has been prepared. Further, the system controller 13 also issues a print starting command to the control means group 3 (memory controller group 16) (step 1).

The control means group 3 (memory controller group 16) produces main-scanning and sub-scanning effective display area signals indicating an effective area of image data. In transmission of the main-scanning and sub-scanning effective display area signals, the synchronization means 4 (synchronizer 17) detects respective main-scanning synchronization signals of the LSU group 21 and activates the control means group 3 (memory controller group 16) at the time when all of the main-scanning synchronization signals are detected (step 2).

When the external apparatus receives the main-scanning and sub-scanning effective display area signals, transfer of a plurality of kinds of image data such as cyan (C), magenta (M), yellow (Y) and black (K) is begun. The plurality of kinds of image data transferred are temporarily held in the image interface means group 2 (video interface group 15) (step 3).

When the control means group 3 (memory controller group 16) confirms that image data sufficient to be stored in the memory means group 5 (dual port RAM group 18) are held in the image interface means group 2 (video interface group 15), the control means group 3 starts an image data memory writing sequence. Thus, the plurality of kinds of image data are stored in memory cells through one data port of the memory means group 5 (dual port RAM group 18) by means of the control means group 3 (memory controller group 16) successively. In this storing operation of the image data, write address information is supplied to one address port by means of a column address counter 27 and a row address counter 28, so that the image data are stored from the address 0 successively as shown in FIG. 3. The image data memory writing sequence is performed continuously until all of the effective image data from the external apparatus have been transferred (step 4).

The control means group 3 (memory controller group 16) judges successively whether a necessary amount of image data are cashed in the memory means group 5 (dual port RAM group 18) or not. In the embodiment, whether image data are stored in the memory area designated by the addresses 0 to {the number of CSADRS×(n−1)} or not is used as a judgment standard, while the time when any address exceeding this address is reached may be used as the judgment standard. The control means group 3 (memory controller group 16) waits in step 5 in which the judgment processing is performed successively until the cashing operation of data is completed. When the cashing operation of data is completed, the process proceeds to step 6 (step 5).

The control means group 3 (memory controller group 16) starts an image data memory reading sequence (step 6). Thus, the plurality of kinds of image data are begun to be read out from the memory cells through the other data port of the memory means group 5 (dual port RAM group 18) by means of the control means group 3 (memory controller group 16) successively and the process proceeds to step 7.

When the image data memory reading sequence is started, a comparator group 26 compares a column address for reading from the column address counter 27 in the image conversion means group 6 (address converter group 19) with a value set in the CSADRS register group 25 successively and when both of them are coincident, an output of the column address counter for reading is incremented by an incrementing unit 29 and is supplied to the other address port of the dual port RAM (step 7).

FIG. 3 shows read memory addresses and positions of data read out from the memory means group 5 (dual port RAM group 18). When a memory area having an address a is now considered, data stored in any of an address (a+1−n) or (a+1+n) will be next read out on the basis of the register set condition in the control means group 3 (memory controller group 16) set in step 1 if the address a is coincident with the value set in the CSADRS register group 25. In this manner, an address in reading is converted and the reading operation is performed.

Figure 6:
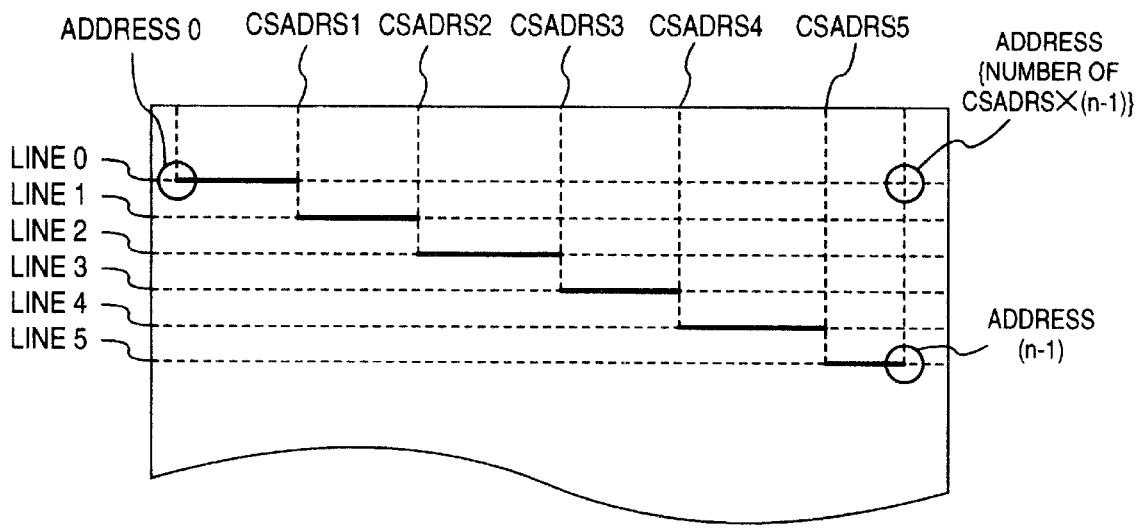
FIG. 6 is a diagram explaining address conversion processing operation (operation example 1) of the embodiment 1 of the present invention.
Figure 7:
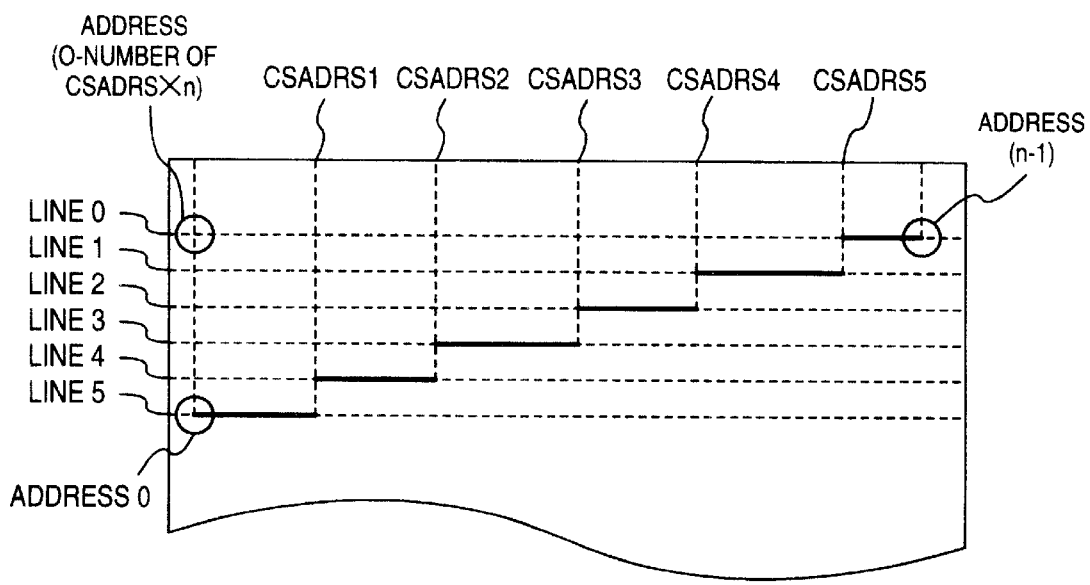
FIG. 7 is a diagram explaining address conversion processing operation (operation example 2) of the embodiment 1 of the present invention.

FIGS. 6 and 7 show definite examples of the address conversion processing in case where images of parallel lines are inputted in the horizontal direction (main scanning direction) by the external apparatus. In the examples, five values are set in the CSADRS register group 25 to be used, while the set values may be any values as far as possible. The address conversion is made each time respective CSADRS is reached. When the address {the number of CSADRS×(n−1)} is reached, the incrementing unit 29 is cleared and the row address counter 28 is incremented, so that reading for a first line is started. With such an address conversion, an image which is inclined to gradually descend rightward as shown in FIG. 6 can be depicted.

In FIG. 7, reading is started from an address (0−the number of CSADRS×n) of a first line. When the reading address reaches CSADRS 1, the address is converted by (a+1+n) and the reading is made continuously. In the same manner, the address conversion is made each time respective CSADRS is reached and when an address (n−1) is reached, the incrementing unit 29 is cleared and the row address counter 28 is incremented so that the reading for the first line is started. With such an address conversion, an image which is inclined to gradually ascend rightward as shown in FIG. 7 can be depicted.

In the embodiment, the column address counter 27 and the row address counter 28 are used in common in writing and reading by adding a minus offset by the number of cashed lines in the incrementing unit 26, while the column address counter 27 and the row address counter 28 may be provided independently for writing and reading. When both the counters are provided independently for writing and reading, a reading time of image in the main scanning direction can be changed and conversion of image in the main scanning direction can be also attained.

Further, when the address conversion is made, jump to the address (a+1−n) or (a+1+n) can be made alternately or freely each time the respective CSADRS is reached to thereby depict a complicatedly curved image, so that mechanical or optical complicated deviation in printing can be treated flexibly. By using these mechanisms, a plurality of kinds of image data can be subjected to image conversion expensively in real time.

(Embodiments 2)

FIG. 1 is also the block diagram schematically illustrating the embodiment 2 of the present invention similarly. Numeral 8 denotes a counting means group and 9 an arithmetic operation means group.

FIG. 2 is also the circuit block diagram schematically illustrating an image processing apparatus in the embodiment 2 of the present invention similarly. In FIG. 2, an arithmetic logical operation unit (hereinafter abbreviated as ALU) realizes the counting means group 8 and the arithmetic operation means group 9.

Figure 8:
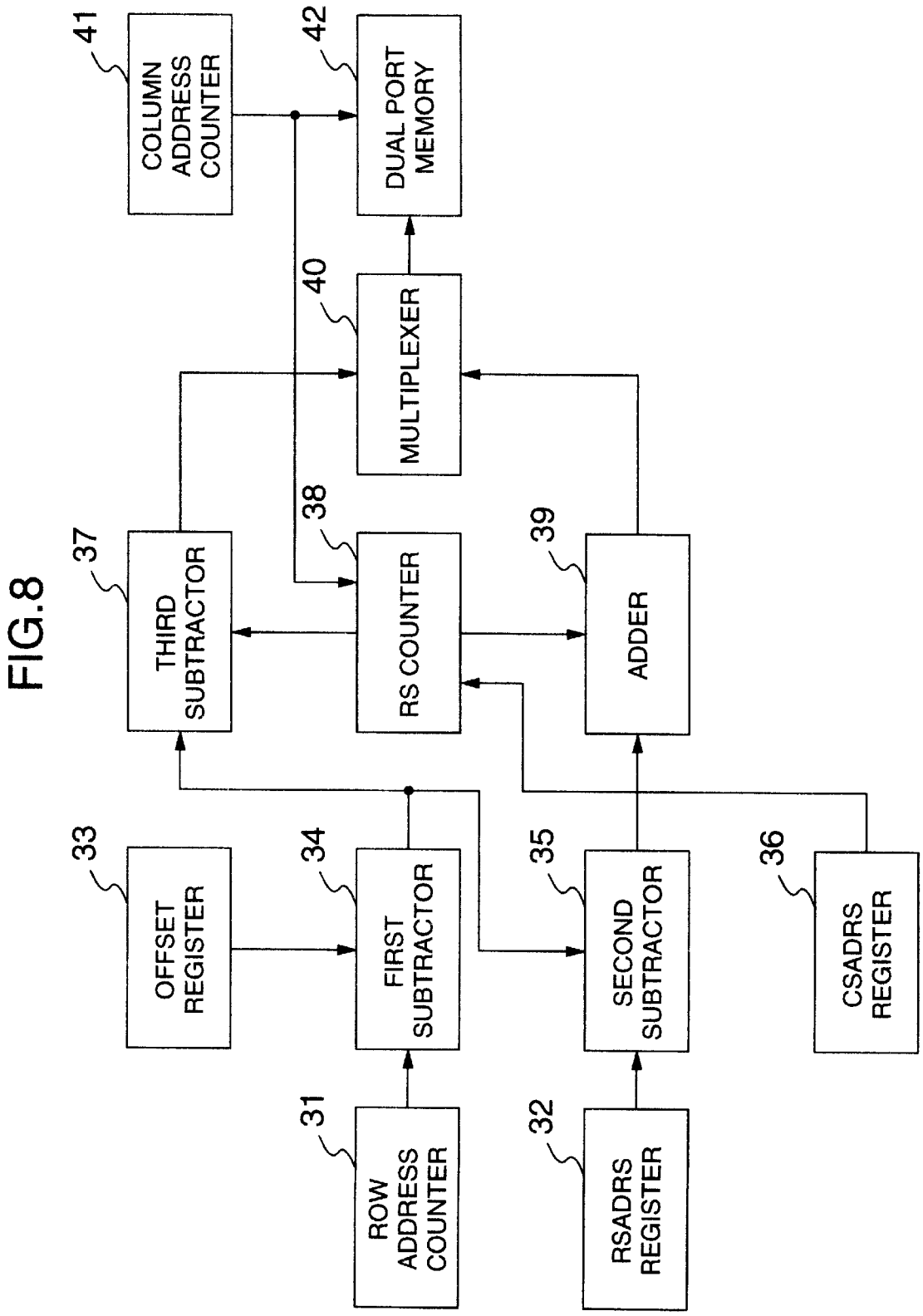
FIG. 8 is a diagram showing connection of a counting means group and a memory means group of the embodiment 2 of the present invention.

FIG. 8 shows a connection diagram of an internal circuit of the counting means group 8 and the arithmetic operation means group 9 (ALU 22) and the memory means group 5 (dual port RAM group 18). Numeral 31 denotes a row address counter, 32 a column selection address register group (hereinafter abbreviated as RSADRS register), 33 an offset register, 34 a first subtractor, 35 a second subtractor, 36 a CSADRS register, 37 a third subtractor, 38 a row selection counter (hereinafter abbreviated as RS counter), 39 an adder, 40 a multiplexer, 41 a column address counter, and 42 a dual port RAM. For simplification of description, FIG. 8 shows only connection to one memory means 5 (dual port RAM 18). In the image processing apparatus, in order to perform delivery and receipt of a plurality of image data, there are provided the row address counter 31, the RSADRS register 32, the offset register 33, the first subtractor 34, the second subtractor 35, th CSADRS register 36, the third subtractor 37, the RS counter 38, the adder 39, the multiplexer 40 and the column address counter 41 which can control a plurality of different physical addresses actually and which can be operated perfectly independently.

FIG. 5 is a flow chart showing the embodiment. In step 1, the RSADRS register 32 is further set and the same control as that of the embodiment 1 is performed in steps 2 to 6. When the image data memory reading sequence is started, the process proceeds to step 7. In step 7, the RS counter 38 measures the number of areas read out on the basis of clock of the column address counter 41 and the measured value is successively compared with a value set by the CSADRS register 36. When both the values are coincident, the value of the RS counter is incremented.

Figure 9:
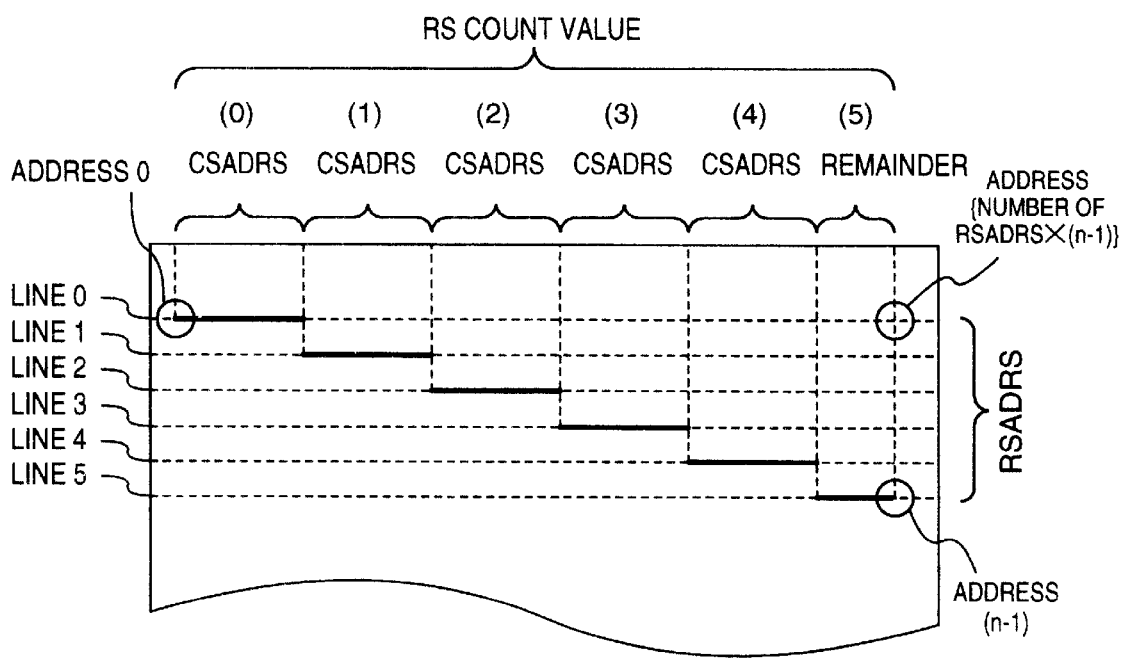
FIG. 9 is a diagram explaining address conversion processing operation (operation example 1) of the embodiment 2 of the present invention.
Figure 10:
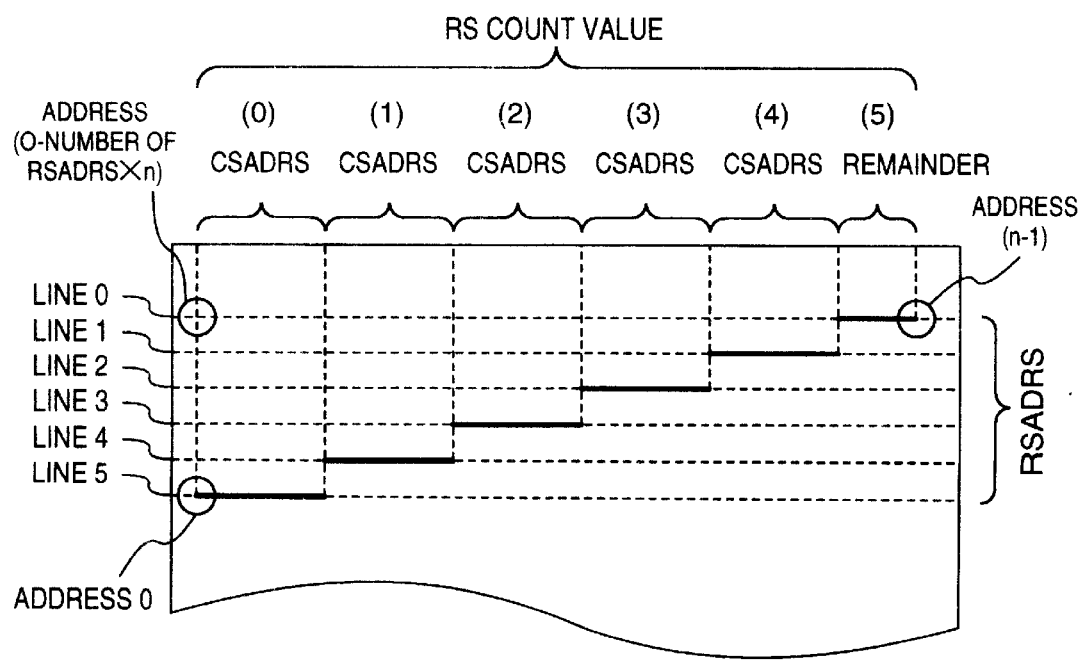
FIG. 10 is a diagram explaining address conversion processing operation (operation example 2) of the embodiment2 of the present invention.

FIGS. 9 and 10 show definite examples of the address conversion processing. Reading is first started from the address 0 of the 0th line. When the number of read-out areas reaches CSADRS, the RS counter 38 is incremented. In the embodiment, the column address counter 41 and the row address counter 31 are used in common in writing and reading by subtracting the number of lines cashed by the offset register 33 and the first subtractor 34, while the column address counter 41 and the row address counter 31 may be provided independently for writing and reading. When both the counters are provided independently for writing and reading, a reading time of image in the main scanning direction can be changed and conversion of image in the main scanning direction can be also attained.

The offset-subtracted row address is supplied to the third subtractor 37 in which a count of the RS counter 38 is subtracted from the row address. The subtracted result is supplied through the multiplexer 40 to the dual port memory 42. Thus, the address is converted by (a+1−n) and the reading is made continuously. In the same manner, the RS counter performs the address conversion each time the number of read-out areas reaches CSADRS.

When the address {RSADRS×(n−1)} is reached, the RS counter 38 is cleared and the row address counter 31 is incremented, so that the reading for the 1st line is started. When a count of the RS counter is coincident with a value of the RSADRS register 32, the address conversion is inhibited and a remaining memory area is read out. With such an address conversion, an image which is inclined to gradually descend rightward as shown in FIG. 9 can be depicted.

In FIG. 10, the offset-subtracted row address is supplied to the second subtractor 35 in which a set value of the RSADRS register is subtracted from the row address. The subtracted result is added to a count of the RS counter in the adder 39 and is further supplied to the dual port memory 42 through the multiplexer 40 switched. Thus, the reading is started from the address (0−RSADRS×n) of the 1st line. When the reading address reaches CSADRS, the address is converted by (a+1+n) and the reading is made continuously. In the same manner, the RS counter 38 performs the address conversion each time the number of read-out areas reaches CSADRS. When the address (n−1) is reached, the RS counter is cleared and the row address counter 31 is incremented, so that the reading for the 1st line is started. When a count of the RS counter 38 is coincident with a value of the RSADRS register 32, the address conversion is inhibited and a remaining memory area is read out. With such an address conversion, an image which is inclined to gradually ascend rightward as shown in FIG. 10 can be depicted.

Further, when the address conversion is made, jump to the address (a+1−n) or (a+1+n) can be made alternately or freely each time the respective CSADRS is reached to thereby depict a complicatedly curved image, so that mechanical or optical complicated deviation in printing can be treated flexibly. By using these mechanisms, a wide-ranging image processing area can be subjected to conversion at the same time or at a different time with simple configuration.

(Embodiment 3)

FIG. 1 is also the block diagram schematically illustrating the embodiment 3 of the present invention similarly. Numeral 10 denotes a pre-virtual image processing means group for adding virtual image data at the beginning of the image processing, and 11 a post-virtual image processing means group for adding virtual image data at the end of the image processing.

FIG. 2 is a circuit block diagram schematically illustrating the image processing apparatus in the embodiment 3 of the present invention similarly.

In FIG. 2, a pre-processing sequencer 23 realizes the pre-virtual image processing means group 10 and a postprocessing sequencer 24 realizes the post-virtual image processing means group 11.

Figure 11:
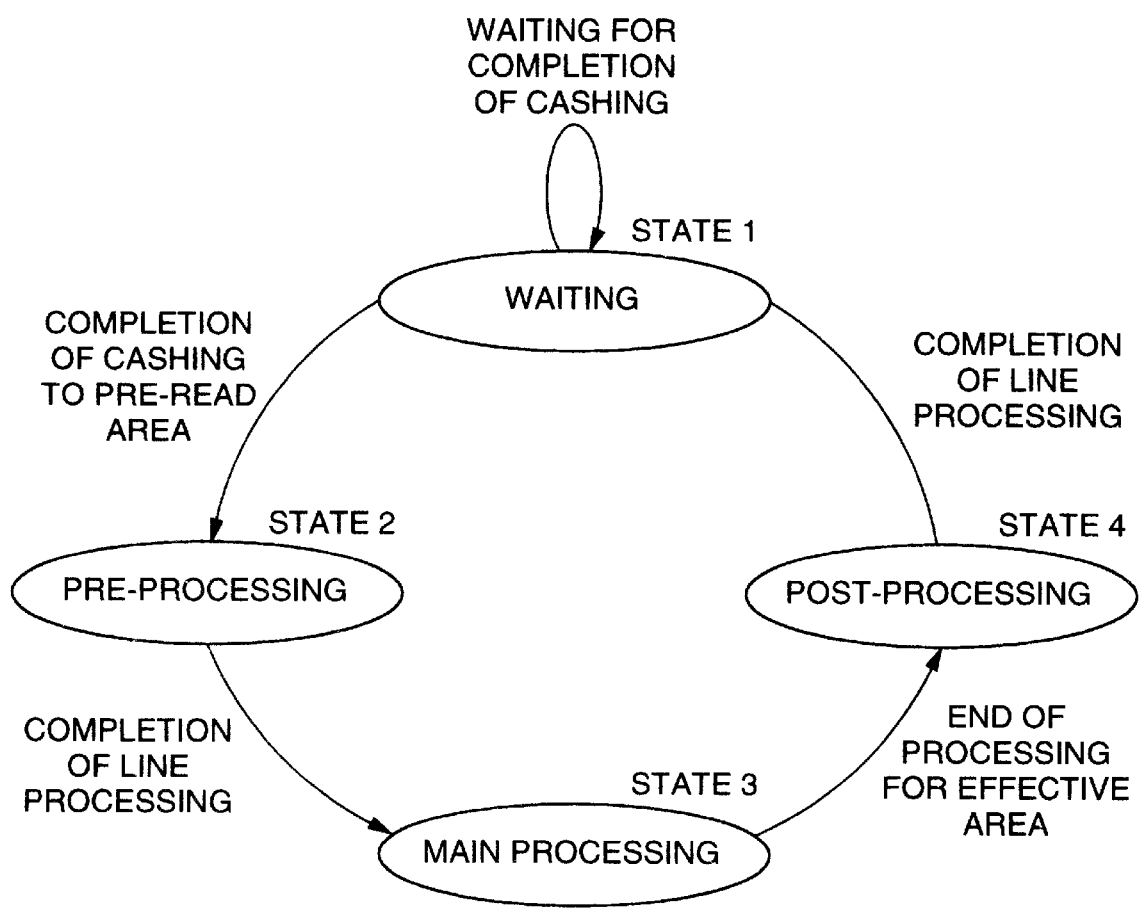
FIG. 11 is a state transition diagram showing operation of the embodiment 3 of the present invention.

A definite description of the embodiment is now made with reference to a state transition diagram shown in FIG. 11. The state transition in FIG. 11 is controlled by the control means group 3 (memory controller group 16). For simplification of description, FIG. 11 shows only the state transition diagram controlled by a single control means group 3 (memory controller group 16). In the apparatus, in order to perform delivery and receipt of a plurality of image data, a plurality of state transition control operations can be performed and the respective operations are perfectly independent.

A state 1 is a waiting state and the process waits in this state during the period of time in steps 1 to 5 shown in the flow chart of FIG. 5. When the cashing operation of data to the memory means group 5 (dual port RAM group 18) is completed by the control means group 3 (memory controller group 16), the state is moved to a next state 2. The control means group 3 (memory RAM group 18) successively judges whether image data is cashed to the memory means group 5 (dual port RAM group 18) by a necessary amount or not. In this embodiment, whether the image data are stored in the memory areas of the addresses 0 to (n−1) or not is used as a judgment standard.

A state 2 is a pre-processing state in which the pre-virtual image processing means group 10 (pre-processing sequencer 23) is activated by the control means group 3 (memory controller group 16). When a count of the RS counter is Q and the number of lines read out by the control means group 3 (memory controller group 16) is V, there is a relation that when the condition of Q≦V is satisfied in FIG. 9, the cashed data are effective and when the condition of Q≧RSADRS−V is satisfied in FIG. 10, the data are effective. The pre-virtual image processing means group 10 (pre-processing sequencer 23) produces the cashed data only when the above condition is satisfied and selects blank image data to be produced when it is not satisfied. Consequently, the number of lines to be cashed can be minimized and the image processing can be made over the area exceeding the memory capacity of the memory means group 5 (dual port RAM group 18). When V>RSADRS, the state is moved to a next state 3.

The state 3 is a main processing state in which data stored in the memory means group 5 (dual port RAM group 18) are used to perform the image processing operation. When the cashing operation for all images is completed and a sub-scanning effective display area signal is false, the state is moved to a next state 4.

As described above, according to the present invention, the plurality of kinds of image data can be subjected to the image conversion inexpensively in real time and the wide-ranging image conversion processing can be made over the area exceeding the respective memory capacities of the memory means group, so that the inexpensive image processing apparatus can be provided advantageously.

What is claimed is:

1. A method of accessing a cell of a memory device for image processing, comprising:

comparing a first value to a first partial address;

changing a second partial address by a prescribed value, if the first value is within a prescribed range of the first partial address; and accessing the cell of the memory device identified by the first and second partial addresses.

2. The method of claim 1, further comprising:

comparing the first partial address to a plurality of different values; and changing the second partial address by a prescribed value, if any of the plurality of different values is within the prescribed range of the first partial address.

3. The method of claim 1, wherein the first value is provided by a chip select register that identifies at least one of multiple memory chips that may be accessed during a period using the first and second partial addresses.

4. The method of claim 1, wherein the second partial address is incremented or decremented by one when the first value equals the first partial address.

5. The method of claim 1, further comprising:

changing the first partial address after each access to the memory device; and both resetting the first partial address to a reset value and changing the second partial address, when the first value reaches an established value.

6. A memory accessing apparatus for image processing, comprising:

a first register that provides a first value;

a first counter that provides a first partial address;

a comparator that compares the first value provided by the first register and the first partial address provided by the first counter, said comparator providing an indication if the first value is within a prescribed range of the first partial address;

a second counter that provides a second partial address;

a logic unit that receives the second partial address from the second counter and then changes the second partial address, if the comparator provides the indication that the first value is within the prescribed range of the first partial address; and a memory comprising a plurality of cells; and an access device, wherein the access device accesses the memory cell identified by the first and second partial addresses.

7. The memory accessing apparatus of claim 6, wherein:

the comparator compares the first partial address to a plurality of different values and provides the indication if any of the plurality of different values is within the prescribed range of the first partial address; and the logic unit changes the second partial address, if the comparator provides the indication that any of the plurality of different values is within the prescribed range of the first partial address.

8. The memory accessing apparatus of claim 6, wherein the first register is a chip select register that identifies at least one of multiple memory chips that may be accessed during a period using the first and second partial addresses.

9. The memory accessing apparatus of claim 6, wherein the logic device increments or decrements the second partial address by one when the first value equals the first partial address.

10. The memory accessing apparatus of claim 6, wherein:

the first counter changes the first partial address after each access to the memory device; and when the first value reaches an established value, the first counter resets the first partial address to a reset value and the second counter changes the second partial address.

* * * * *